United States Patent [19]

Buchar et al.

[11] Patent Number: 4,967,233
[45] Date of Patent: Oct. 30, 1990

[54] FIXED FULL WIDTH ARRAY SCAN HEAD CALIBRATION APPARATUS

[75] Inventors: Wayne A. Buchar, Holcomb; Keith A. Nau, Webster; Pierre A. Lavallee, Fairport, all of N.Y.

[73] Assignee: Xerox Corporation, Stamford, Conn.

[21] Appl. No.: 449,670

[22] Filed: Dec. 11, 1989

[51] Int. Cl.⁵ .............................................. G03G 15/28
[52] U.S. Cl. ..................................... 355/233; 355/235
[58] Field of Search ............... 355/233, 232, 228, 229, 355/241, 235, 200; 358/474, 494

[56] References Cited

U.S. PATENT DOCUMENTS

| | | | |
|---|---|---|---|
| 4,261,661 | 4/1981 | Thiers | 355/319 |
| 4,429,333 | 1/1984 | Davis et al. | 358/496 |
| 4,464,681 | 8/1984 | Jacobs et al. | 358/406 |
| 4,475,128 | 10/1984 | Koumura | 358/296 |
| 4,500,195 | 2/1985 | Hosono | 355/208 |
| 4,536,077 | 8/1985 | Stoffel | 355/235 |
| 4,538,896 | 9/1985 | Tajima et al. | 355/200 |
| 4,562,485 | 12/1985 | Maeshima | 358/401 |
| 4,563,706 | 1/1986 | Nagashima | 358/401 |
| 4,571,636 | 2/1986 | Itoh | 358/482 |
| 4,574,316 | 3/1986 | Wilman et al. | 358/482 |
| 4,588,280 | 5/1986 | Ogawa et al. | 355/200 |
| 4,604,161 | 8/1986 | Araghi | 156/645 |
| 4,605,970 | 8/1986 | Hawkins | 358/406 |
| 4,607,941 | 8/1986 | Honda | 355/210 |
| 4,618,248 | 10/1986 | Buchar | 355/235 |
| 4,636,058 | 1/1987 | Fujii | 355/233 |
| 4,647,184 | 3/1987 | Russell et al. | 355/208 |
| 4,666,284 | 5/1987 | Yamada | 355/233 X |
| 4,706,125 | 11/1987 | Takagi | 358/406 |
| 4,724,330 | 2/1988 | Tuhro | 358/494 X |
| 4,743,974 | 5/1988 | Lockwood | 358/494 |
| 4,806,977 | 2/1989 | Mizutani et al. | 355/234 |
| 4,833,724 | 5/1989 | Goel | 359/494 X |
| 4,839,730 | 6/1989 | Shirakoshi et al. | 358/483 |

FOREIGN PATENT DOCUMENTS 62-51368  3/1987  Japan .
62-51369  3/1987  Japan .
62-51370  3/1987  Japan .

OTHER PUBLICATIONS

Xerox Disclosure Journal; "Automatic Duplex Document Electronic Scanning"; R. E. Smith, vol. 8, No. 3, May/Jun. 1983; p. 263.

Primary Examiner—A. T. Grimley
Assistant Examiner—Sandra L. Hoffman
Attorney, Agent, or Firm—Mark Costello

[57] ABSTRACT

In an input scanner provided with a document input, a sheet feeding path for transporting documents to a scanning station and to a document output; a scanning station having at least a first scanning element, normally fixed in position relative to the sheet feeding path, and supporting a full width array of photosensitive sensors with a coresponding optical arrangement for directing light from the document to the sensors, there is provided an arrangement for bringing the optical arrangement and sensors of the scanning element to a calibration sensing position for detection of a calibration target provided in a fixed position within the input scanner, while retaining the scanning element at a fixed position relative to the sheet feeding path. The arrangement for moving the optical arrangement and sensors of the scanning element to a calibration sensing position for detection of a calibration target may also provide movement to a service position to allow access to the sensors from a position exterior to the input scanner without disassembly of the scanning head from the input scanner.

18 Claims, 4 Drawing Sheets

FIXED FULL WIDTH ARRAY SCAN HEAD CALIBRATION APPARATUS

This invention relates generally to raster input scanners for acquisition of image information, and more particularly to a raster input scanner having a fixed position scan head, and an arrangement for providing a calibration pattern therefor.

INCORPORATION BY REFERENCE

The following are incorporated by reference for their teachings: U.S. Pat. No. 4,743,974 to Lockwood; U.S. patent application Ser. No. 07/216,475, filed Jul. 8, 1988, and assigned to the same assignee as the present application.

CROSS REFERENCE TO RELATED APPLICATIONS

Cross reference is made to U.S. patent application Ser. No. 07/436,276 to Wong et al., filed Nov. 14, 1989, and entitled "Input Scanner Document Handler Having a Curved Path CVT", and to U.S. patent application Ser. No. 07/435,918 to Rogalski, filed Nov. 13, 1989, and entitled "Scanning Motion Control in an Image Input Device".

BACKGROUND OF THE INVENTION

Acquisition of information adaptable for electronic processing applications directly from printed original documents has become greatly desirable as an adjunct to electronic document production. An important reason for its desirability is the subsequent capability of manipulation of the electronically stored information for editing, compiling and using the information in forms other than that in which it was originally available. While such manipulation is, of course, available for image information produced originally and available in an electronic format, it is desirable to have a similar capability for image information not so available. Accordingly, it is desirable to have an image information input capability for such information. In addition to the production of new documents from electronically stored information, it will also be appreciated that some copying functions available in light lens-type copiers, copying images directly from original documents, may be more readily accomplished if image information is available electronically. Thus, with the capability of electronic input of information, coupled with available output devices, functions such as duplex copying, image rotation, cropping, editing, etc, are possible without the requirement of difficult mechanical manipulation of originals and copies.

A particular problem associated with electronic acquisition of image information is the speed of possible input. Heretofore, scanning arrays, i.e., linear or two dimensional arrays of semiconductor elements suitable for detection of light from an illuminated image, have been limited in size by an inability to manufacture sizable lengths thereof, thereby requiring optical magnification and focusing elements to derive an image from a document suitable for detection by the sensors of the scanning array. It has often been necessary to provide overlapping lengths of small sensors arrays to build longer lengths to accommodate document scanning. While these scanning arrays have had some success, they require extensive software manipulation to provide a correct output image, resulting in slower data or image acquisition rates. In view of the slow rate of data acquisition, relatively little work has been done on a faster document handling system for such arrangements. Recently, however, scanning arrays have become available which include a linear array of sensors extending the full width of a document. These arrays may be used to scan a document with a single pass, without magnification or optical manipulation of the image to accomodate the size to the scanning array, or software manipulation of images from overlapping arrays. These arrays are also improving in speed of image acquisition so that less time is required for each sensor to derive sufficient light information about a given image point, and transfer the information to an electronic data processor. Such arrays and their benefits over previous types of sensor arrays are described in U.S. Pat. No. 4,604,161 to Araghi, incorporated herein by reference.

In view of the above factors, it has become desirable to provide arrangements allowing faster document handling, particularly adapted to these applications of input scanners. It is desirable to provide a scanning device for scanning duplex documents, i.e., original documents having image information on both sides, for simplex documents having image information only on a single side, and for material not adaptable to be passed through sheet handling devices. In the past, this feature has been approached in input scanners in a variety of ways. As shown in U.S. Pat. No. 4,536,077 to Stoffel, an arrangement is provided with an optical system to direct light reflected from a first side of the document to a single scanning array, while the document is moving past a first position, and subsequently directing light from the second side of the document to the scanning array when it has reached a second position. The arrangement does not optimally substantially simultaneously scan the both sides of the document, requires expensive optical arrangements to transmit the image optically to the single sensor, and allows the operation of only a single sensor during a selected period of time. A disclosure entitled "Automatic Duplex Document Electronic Scanning" by Richard E. Smith, and published at Xerox Disclosure Journal, Vol. 8, No. 3, May/June, 1983 at page 263, demonstrates both side scanning of a document with two spaced apart scanning arrays arranged on opposite sides of a document path, and platen scanning by a movable carriage supporting one of the arrays. This arrangement requires multiple scanning positions and document advancement through the scanning areas at significant expense. U.S. Pat. No. 4,429,333 to Davis et al. demonstrates an arrangement which requires inversion of documents for scanning both sides thereof at a scanning position. U.S. Pat. No. 4,571,636 to Itoh demonstrates an optical arrangement for scanning both sides of a document directed along a paper path with a single scanning array, while U.S. Pat. No. 4,261,661 to Thiers shows a similar arrangement in a light lens copier. U.S. Pat. No. 4,563,706 to Nagashima and U.S. Pat. No. 4,562,485 to Maeshima demonstrate integral scanner/printer arrangements. U.S. Pat. No. 4,839,730 to Shirakoshi et al. is directed to a simplex scanning arrangement. U.S. Pat. No. 4,475,128 to Koumura shows a duplex scanning arrangement, that appears to also provide a moving scanning element. Japanese Laid Open Patent Application Nos. 62-51368, 62-51369, and 62-51370 all shows various aspects of a substantially simultaneous duplex scanning device. U.S. Pat. No. 4,743,974 to Lockwood suggests a scanner provided with a pair of scan elements arranged in opposition for substantially simultaneous duplex scanning of documents moving though a scanning station, and providing for movement of one of the scan elements for a platen scanning arrangement. All the patents and publications cited hereinabove are incorporated herein by reference.

A primary problem associated with electronic input scanners is a periodic requirement for calibration of the sensor arrangement. Because a large number of photosensitive elements make up the scanning array, uniformity of response is necessary for good imaging quality. However, varying electronic characteristics of the sensors, aging illumination sources, and varying mechanical tolerances within a scanning device all contribute to variations in the light intensity response of the sensors in the device. Frequent calibration is required against a target having a known reflectance value. U.S. Pat. No. 4,574,316 to Wilman et al. discloses a document scanner unit which rotates into at least one other scanning position to receive light reflected from a remote source. U.S. Pat. No. 4,464,681 to Jacobs et al. suggests an optical scanning system comprising a linear photodiode array which can be adjusted in position to view an optical test pattern. U.S. Pat. No. 4,605,970 to Hawkins discloses a calibration arrangement which moves an optical scanning head assembly from a reference location into a testing position to view an optical test pattern. U.S. Pat. No. 4,706,125 to Takagi discloses an image reading device comprising an integrated image reading unit and an optical sensitivity checking member which concurrently translate in unison from an inoperative position into an operative posititon during the scanning of an original. In somewhat analogous light lens copying devices, U.S. Pat. No. 4,806,977 to Mizutani et al. discloses a movable carriage housing for a scanning-type optic apparatus wherein a rack and pinion arrangement alows an upper body portion apparatus to pivto outwardly to expose a transfer station and scanning head for maintenance. U.S. Pat. No. 4,607,941 to Honda discloses an image forming apparatus containing an interchangeable process unit mounted onto a housing, which can be serviced by sliding the unit along a set of securing rails. U.S. Pat. No. 4,583,896 to Tajima et al., U.S. Pat. No. 4,500,195 to Hosono, and U.S. Pat. No. 4,588,280 to Ogawa et al. disclose electrostatic copying machines having units which rotate about a pivotal axis to expose an imaging system for maintenance and repair.

It has been found somewhat undesirable to use a calibration target on a sheet provided to the user to run through the scanning device to scan for calibration purposes. The sheets tend to degrade in image quality. Imperfect copies of the sheets may be used. The process is not automatic and thus requires operator intervention to feed the sheet. All these elements make a separate of paper an undesirable calibration target.

SUMMARY OF THE INVENTION

In accordance with the invention in an electronic input scanner having a fixed scan head supporting an full width array of sensors for scanning documents directed therepast, there is provided an arrangement for providing a calibration target for normalizing the sensor response across the array.

In accordance with the invention, in an input scanner provided with a document input, a sheet feeding path for transporting documents to a scanning station and to a document output; a scanning station having at least a first scanning element, normally fixed in position relative to the sheet feeding path, and supporting a full width array of photosensitive sensors with a corresponding optical arrangement for directing light from the document to the sensors, there is provided an arrangement for bringing the optical arrangement and sensors of the scanning element to a calibration sensing position for detection of a calibration target provided in a fixed position within the input scanner, while retaining the scanning element at a fixed position relative to the sheet feeding path. Generally, the scanning element is rotated about an axis transverse to the direction of paper travel through the scanning station, and parallel to the paper path, with the axis through the scanning element.

In accordance with another aspect of the invention, the arrangement for moving the optical arrangement and sensors of the scanning element to a calibration sensing position for detection of a calibration target may also provide movement to a service position to allow access to the sensors from a position exterior to the input scanner without disassembly of the scanning head from the input scanner.

Other objects and advantages will become apparent from the following description taken together with the drawings in which.

Figure 1:
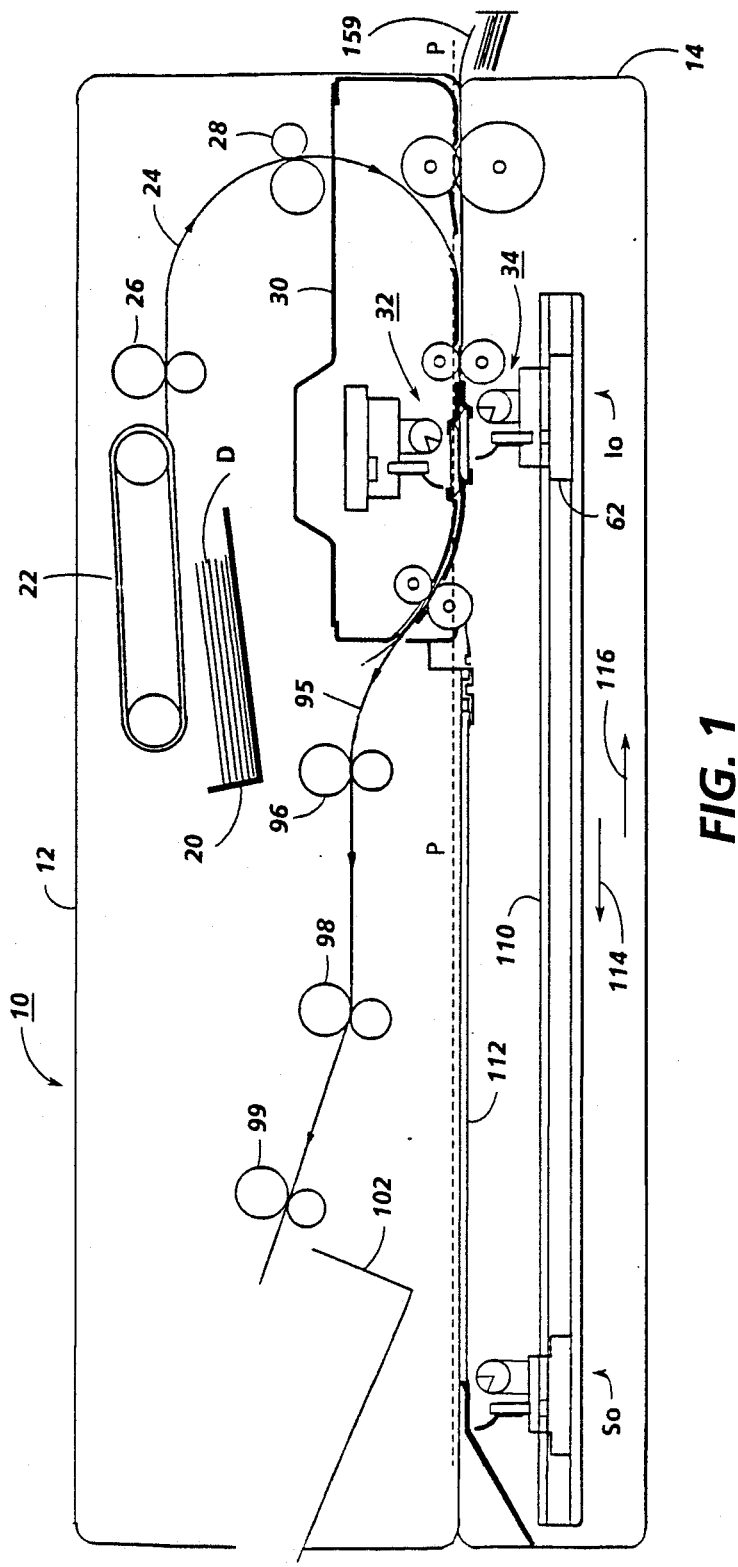
FIG. 1 is a somewhat schematic view of an input scanning device in accordance with the present invention.

Referring now to the drawings where the showings are for the purpose of illustrating a preferred embodiment of the invention and not for limiting same, FIG. 1 shows an input scanner 10 in accordance with the invention for generating an electronic representation of an image on a document. As used hereinafter, "document" refers to an image bearing original from which copying is desired. Documents may comprise image supporting substrates, such as cut sheets of paper, transparencies or other individual pieces of flimsy material, unburst computer forms forming a continuous length of material, or any image bearing substrate from which copying is desired. When necessary, the type of document for which the description finds use will be described with greater particularly. "Image" as used herein refers to the information on the document, for which scanning is desired, and which will be in some manner copied to another substrate or to an electronic storage medium. "Scanning" as used hereinafter, refers to the relative movement of photosensitive sensors with respect to documents for the purpose of acquiring an electronic representation of the image or information about the image.

Input scanner 10 may be comprised of upper and lower frame members 12 and 14. Upper and lower frame members 12 and 14 may be generally rectangular box-shaped members, connected by a hinge member (not shown) along lower and upper rear edges of frame members 12 and 14, respectively. Upper and lower frame members 12 and 14 separable in a clam shell fashion at the hinge member to allow access to the area thereinbetween as will hereinafter be described.

Upper frame member 12 is provided with a document input tray 20 for holding a stack of documents D such as cut sheets of paper face-up in the document tray from which data acquisition is desired. Document input tray 20 is provided with a document feeder 22 for feeding documents D out from document input tray 20. In a preferred embodiment of the invention, document feeder 22 may be a well-known top feeding vacuum corrugated feeder found in standard document feeders for light-lens type copiers for feeding documents in a 1-N order. Document input tray 20 may also be upwardly biased or provided with a tray elevator (not shown) to provide documents D in position for feeding.

Documents D are directed by document feeder 22 to an input sheet path 24 to be directed to a scanning position. Along sheet path 24, documents D are given along by nip roll 26, comprising a pair of rubber rollers which drive the documents in a forward direction along the sheet path 24. A second nip roll roll 28 may advantageously comprise a cross roll deskewing nip to provide documents in a desired registered position before entering the scanning station. A drive motor (not shown) is provided for driving the document feeder, and drive rollers in the nips, as well as the other driving elements of input scanner 10.

Documents D are driven along input sheet path 24 into scanning station 30. Scanning station 30 is comprised of upper and lower scanning elements 32 and 34. Upper scanning element 32 is fixed in position with respect to sheet path 24, and comprises an upper scanning element frame generally indicated as 36. Frame 36 extends transversely across and above the path of document travel, for the support of the scanning array for scanning a document passing thereunder. On an upper portion of frame 36, scanning array 38 is supported on scanning array support member 40, transverse to the path of sheet travel thereby for scanning documents. Scanning array support member 40 is a relatively rigid member fixed to the frame 36 by fasteners or adhesives, and supporting scanning array 38 in position across the path of document travel, without sagging or twisting which could cause imaging imperfections. Scanning array 38 may be a linear array of photosensitive sensors such as CCD's or photodiodes which are controlled to sense light reflected from documents during an integration period. The photosensitive sensors develop a charge indicative of the amount of light detected, for transmission to an image processor for use in assimilating an electronically stored representation of the image on the document. In a preferred embodiment of the invention, the array may comprise several smaller arrays butted at their ends to each other to form an unbroken array, extending the full width of the document to be scanned as described in U.S. Pat. No. 4,604,161 to Araghi, although other sensor array arrangements are possible, including staggered smaller arrays electronically stitched to give the results of a continuos array.

Figure 2A:
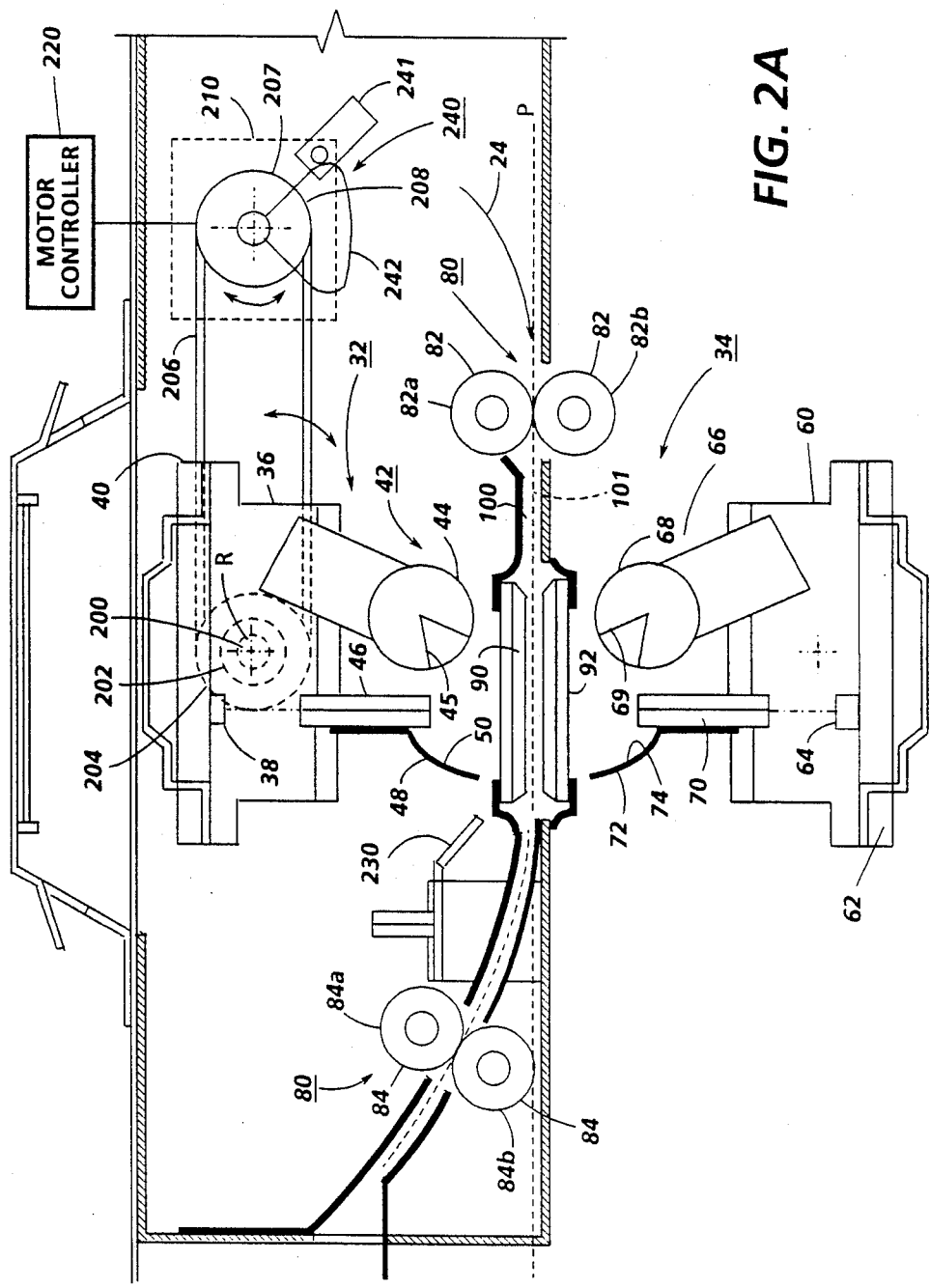
FIG. 2A is an enlarged view of the moving document scanning station of the device in FIG. 1.

With reference to FIG. 2A, documents directed past scanning element 32 are illuminated by a lamp assembly supported on frame 36 and comprising lamp 42, and lamp cover 44 having aperture 45 engaged to a power supply (not shown) and directing light towards the document to be scanned. Light from the illuminated document is reflected to lens 46, comprising a bundle of image transmitting fiber produced under the trade name of "SELFOC" by Nippon Glass Company Limited, provided to direct light reflected from the document to scanning array 38. Adjacent to the portion of lens 46 closest to the document is a reflector member 48, extending generally towards the document which may be advantageously provided with a light reflecting concave surface 50 to further aid in directing light from lamp 42 to illuminate the document. It will, of course, be appreciated that other optical and illuminating systems may be used to illuminate and direct light from the document to the scanning array 38. Lower scanning element 34 is provided as a mirror image of scanning element 32, including a frame 60, scanning array support member 62, scanning array 64, lamp assembly including lamp 66 and lamp cover 68 having aperture 69, lens 70 and reflector member 72 having a reflective surface 74. The primary difference between the two scanning elements is that the lower scanning element 34 is arranged in a position opposing that of upper scanning element 32, in order to scan images on a side of the document opposite to that scanned by the upper scanning element 34. Accordingly, images on the upper face of documents passing through the scanning station 30 are illuminated and scanned by upper scanning element 32, while images on the lower face of the document are illuminated and scanned by the lower scanning element 34. In practice, it is preferable to have the elements slightly offset from one another so that the illumination provided for scanning one side of the document does not cause shadows detectable by the sensors in the scanning arrays to show through the documents.

Documents entering the scanning station are driven into and through the station by a four roll Constant Velocity Transport (CVT) arrangement 80 comprising upstream and downstream sets of rolls 82 and 84 located at the entry and exit to the scanning station, respectively. Each nip roll pair is comprised of upper idler rolls 82a and 84a and lower drive rolls 82b and 84b. Drive rolls 82b and 84b are driven by a motor (not shown) through a timing belt arrangement that maintains the speed of the rolls and accordingly, the speed of documents moved by the rolls at a carefully controlled constant velocity. Downstream rolls 84 are located above the imaging plane P so as to not interfere with movement of lower scanning elements 34.

Sheets transported through scanning station 32 are directed between platen glass members 90 and 92 supported respectively on upper and lower frame members 12 and 14 which serve to maintain flatness in documents advancing therethrough for scanning. The platen glass members 90 and 92 are each about 4 mm thick, for support of the document as it passes through the scanning station. The platen glass members 90 and 92 are supported with a spacing of about 0.6 mm between them, defining a paper path 100. The glass thickness and gap are chosen to be as small as possible because the depth of field of the SELFOC lens is very small. In another embodiment, a document may be biased against a single platen glass member by a baffle, thereby achieving the required flatness while the docuemnt passes through the scanning station.

As documents are advanced through scanning station 30, photosensitive sensors on scanning arrays 38 and 64 are exposed to light reflected from the document to derive an electronic representation of the image thereon for transmission to an image processing or storage device. In a preferred embodiment of the invention, for duplex documents, image information from each side of the document is derived and transmitted alternately by each respective array. Thus, for example, while array 38 is deriving image information, array 64 may be transferring previously derived image information out of the array.

With reference again to FIG. 1, upon leaving the scanning station 32, documents are driven by the CVT through sheet path 95 wherealong documents are driven by nip roll pairs 96, 98 and 99 into an output tray 102. The passage of documents along the described sheet path, having a generally U-shape, with a single fold, and feeding the documents in the input tray 20 from the top of the input stack, provides a single natural inversion of the documents, so that they are arranged face down in output tray 102 in the same order that they were originally provided. In a preferred embodiment of the invention, the output tray may be a simple low energy uphill stacking tray without requirement for mechanical document handling therein. While an arrangement providing a document handler recirculating the documents back to an input tray is certainly possible, there is no need for the expensive and complicated mechanical document handling in those devices, since there is no need to repeatedly present the document for copying as in a light lens copier. Both sides of the document may be read simultaneously, and the image informaion stored for copying as desired in an electronic storage medium.

Lower scanning element 34, normally arranged closely adjacent to scanning element 32, is also supported for reciprocating scanning movement, as will be described hereinafter, on support rails 110. Support rails 110 are provided in lower frame portion 14, parallel to the direction of document travel of sheet trave through scanning station 30, and located, in a preferred embodiment, generally on either side of the path of sheet travel. In FIG. 1, only a single support rail 110 is shown, but usually at least two will be provided. Scanning element 34 may be provided with bearings or bushings to reduce sliding friction between scanning element 34 and the rails 110. Rails 110 support the scanning element 34 for movement across the length of lower frame portion 14 slightly below a scanning platen 112. Scanning platen 112 is a generally rectangular member having a size allowing the placement of documents thereon for scanning by the scanning element 34 as it moves across the length of the lower frame 14. Scanning platen 112 is supported at its edges on lower frame 14. Scanning platen 112 supports documents not readily fed from document inout stack 20, such as pages of books, single sheets in bound documents, documents too thick, fragile or damaged to be fed along paper paths 24 and 100, or objects having surfaces or profiles desired to be copied. On selection of platen copying, i.e., copying of images from a document placed on scanning platen 112, lower scanning element 34 moves from an initial position $I_0$ fixed with respect to upper scanning element 32, and generally adjacent a first end of the scanning platen 112, across the length of lower frame 14 and scanning platen 112 in the direction of arrow 114 to a start of scan position $S_0$ at the opposite end of the scanning platen. In a preferred embodiment, during the movement of the scanning elemenr 34 to position $S_0$, the scanning array is generally inoperative for acquiring image data, although it is well within contemplation of the invention to either scan the document for image information, or to provide a pre-scan operation which allows a fast, gross scanning operation to derive an appropriate contrast level, or threshold information for use by the image processing device. Image scanning is preferably accomplished by movement of the lower scanning element from position $S_0$ back to position $I_0$ in the direction indicated by the arrow 116.

Figure 2B:
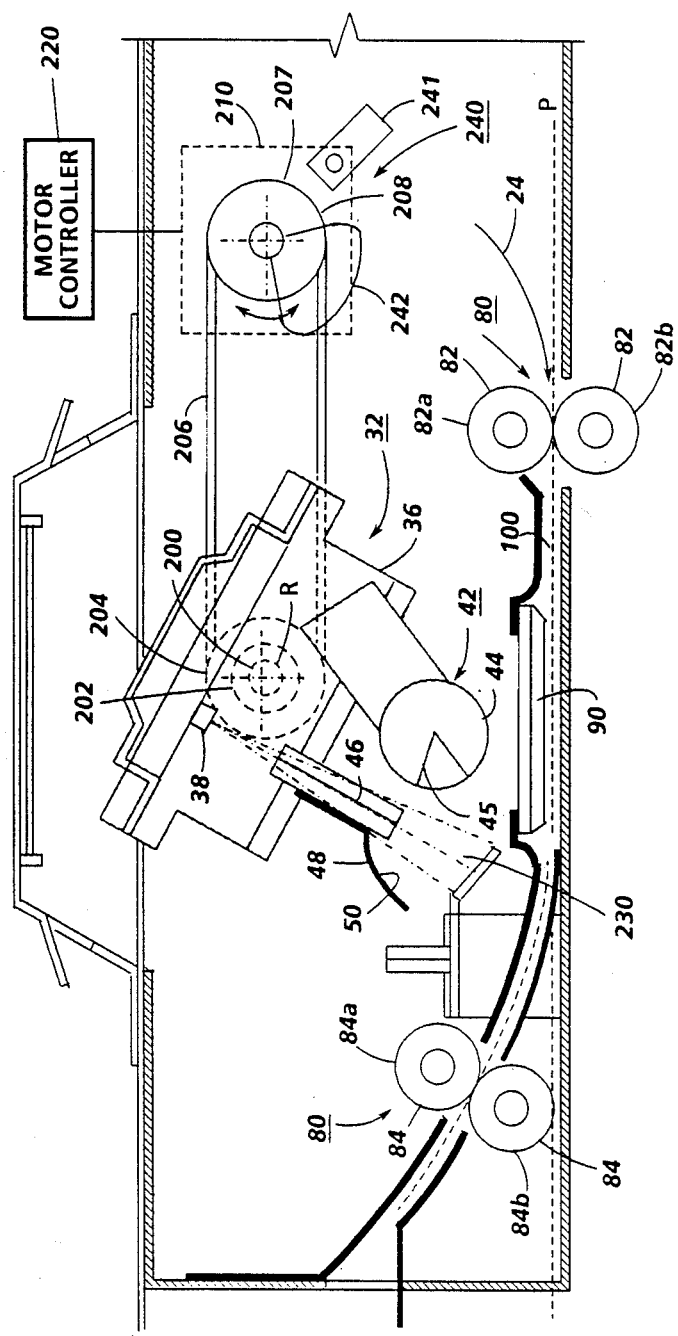
FIG. 2B is a somewhat schematic view showing the rotated position of the scanning element for calibration.
Figure 2C:
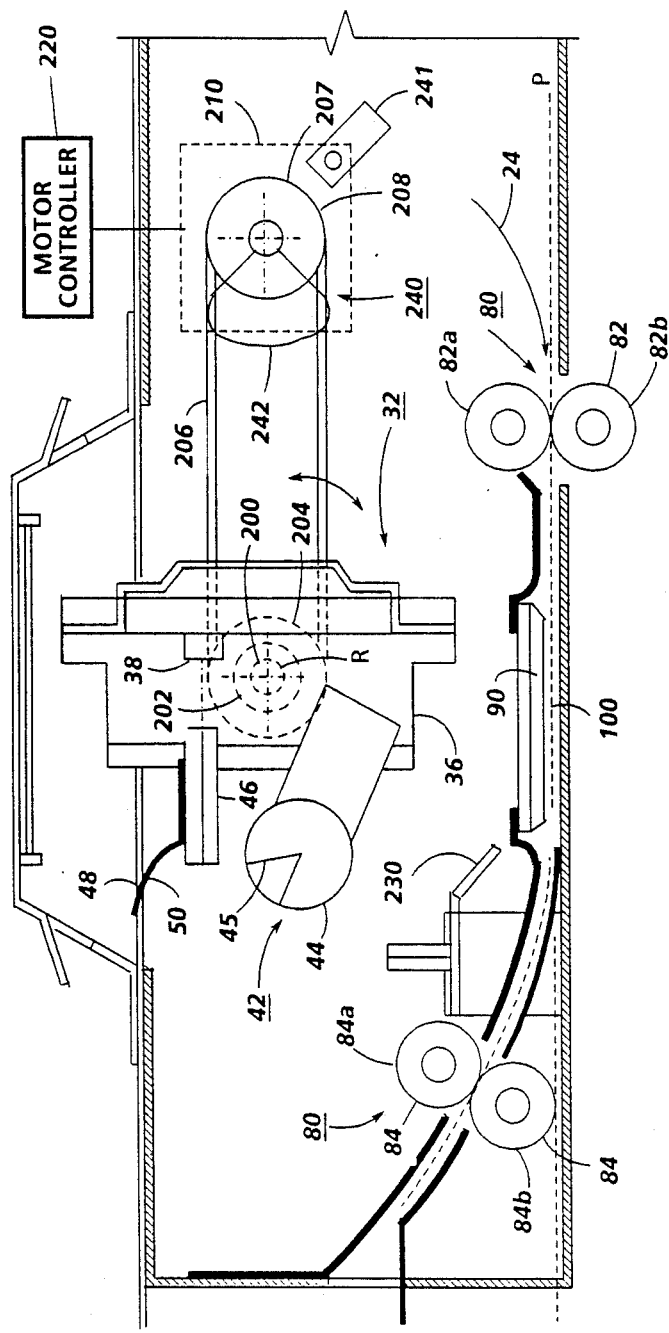
FIG. 2C is a somewhat schematic view showing the rotated position of the scanning element for service.

In accordance with the invention and as illustrated in FIGS. 2A-2C, for calibration and service purposes, fixed upper scanning element 32 may be journaled for rotation out of its scanning position with respect to the paper path, in order to bring the optical and sensor arrangement to a position to view an on-board test pattern. Scanning element 32 is supported for rotation about an axis R, where axis R is arranged generally transverse to the direction of paper path movement through the scanning station and parallel to the imaging plane P. Scanning element 32 is supported via a pair of brackets (not shown) at both inboard (operator side of the scanning device) and outboard (the opposite side of the device from the operator) ends thereof on a pair of shaft or pivot members 200 (outboard side only shown), which in turn are supported for free rotating movement on the machine frame within a bearing member 202. On the outboard side of the device, pivot member 200 also supports in fixed engagement therewith a scanning element pulley member 204, rotation of which causes pivot member 200, and thus, scanning element 32 to rotate about axis R. Pulley member 204 is driven through its rotational movement with a drive or timing belt 206 wrapped therearound, with the opposite end of timing belt 206 opposite end wrapped around motor pulley member 207 supported on a drive shaft 208 connected to stepper motor 210. Pulley members 204 and 207, and timing belt 206 may have complementary teeth for positive driving engagement between the belt and pulley members.

Stepper motor 210 is controllably driven with a motor controller 220, responsive to whatever control arrangement is provided in the device. Of course, it will be recognized that while a stepper motor connected via a pulley drive arrangement is described for driving the scanning element in its rotational motion, a servo motor could be used equally as well, as could a direct arrangement.

As shown in FIG. 2B, rotation of scanning element 32 moves in combination the lamp 42, lens 46 and sensor 38 of the scanning element 32 away from its position with respect to the moving document scanning platen past a series of calibration positions for detection of a sensor calibration target on surface 230, arranged with respect to scanning element 32 at a distance corresponding to that of the scanning plane from the scanning element when the scanning element is in operative scanning position. Thus, the optical and sensing arrangement that is calibrated is identical to the optical and sensing arrangement that will perform the imaging function of the device. Surface 230 may be supported on the machine frame or on a paper path baffle. The position of the scanning element in its calibration mode relative to the position of the scanning element in its operational mode is not critical. Thus, surface 230 could be positioned at a variety of locations along the arcuate path described by the focal length of the lens 46.

The actual target on surface 230 is not critical, but typically comprises at least a black target, and a white target. The black target is used as a reference by the image processing electronics to determine sensor offset levels and flare light levels. Sensor offsets levels may also be determined by measuring photosite response with the lamp turned off. The white target is used to determine sensor and optical/illumination system gain. Each particular target has a width and length selected so that every sensor in the array simultaneously detects the same target. Desirably, the targets are arranged along a sequential path of the scanning element rotation, and detected in accordance with machine requirements for diagnostics purposes. Stepper motor 220 drives the scanning element 32 for a predetermined number of steps to bring the element to each scanning position.

Alignment of scanning element 32 at the scanning position of FIG. 2 is a critical alignment, while alignment at the calibration detection targets position is less so, and accordingly, a sensor arrangement may be used to detect when the scanning element 32 has been returned to the scanning position. A sensor arrangement 240 shown in FIGS. 2A, 2B and 2C, is desirably a simple photosensitive detection sensor 241, which detects the presence or absence of a flag 242 on pulley member 207, to indicate return of the pulley, and thus the scanning element, to the home position.

As shown in FIG. 2C, rotation of scanning element 32 moves in combination the lamp 42, lens 46 and sensor 38 of the scanning element 32 further away from its position with respect to the moving document scanning platen to an access position for service. At this position, access to lamp 42, lens 46 and sensor 38 of the scanning element 32 are provided, without disassembly of the scanning element from its position with respect to the document path. Of course, rotation may be continued to a 180° position for additional service access as required.

It will of course be understood that in a modified duplex arrangement, where the second scanning element is supported in a fixed position, it may be similarly rotatably mounted for calibration purposes.

The invention has been described with refernce to a particular embodiment. Modifications and alterations will occur to others upon reading and understanding this specification. It is intended that all such modifications and alternations are included insofar as they come within the scope of the appended claims or equivalents thereof.

We claim:

1. An input scanner having a document input, a document output and a document transport arrangement for carrying documents from said input to said output along a paper path, a scanning station located along said paper path for scanning documents transported therepast having at least one scanning element including a frame integrally supporting an illumination source, a lens and an array of photosensitive elements, and means for providing a calibration target for said scanning element, said calibration target providing means comprising:
   means for supporting said scanning element for rotation about an axis, transverse to the direction of paper travel along said paper path, and parallel to said paper path; and
   means for driving said scanning element in rotation about said axis, to bring said illumination source, said lens and said array of photosensitive elements to a position for detect said calibration target.

2. The device as defined in claim 1 wherein the axis of rotation extends through said scanning element.

3. An input scanner having a document input, a document output and a document transport arrangement for carrying documents from said input to said output along a paper path, a scanning station located along said paper path for scanning documents transported therepast having at least one scanning element including a frame integrally supporting an illumination source, a lens and a full width array of photosensitive elements, and means for providing a calibration target for said scanning element, said calibration providing means comprising:
   means for supporting said scanning element for rotation about an axis, transverse to the direction of paper travel along said paper path, and parallel to said paper path; and
   means for driving said scanning element in rotation about said axis, to bring said illumination source, said lens and said array of photosensitive elements past a calibration target arranged proximate to said scanning element for detection thereof.

4. The device as defined in claim 3 wherein said axis of rotation extends through said scanning element.

5. The device as defined in claim 3 wherein said means for driving said scanning element in rotation about said axis provides movement past a calibration target, and to a service position.

6. An input scanner having a device frame supporting a document input, a document output and a document transport arrangement for carrying documents from said input to said output along a paper path, a scanning station located along said paper path for scanning documents transported therepast and having at least one scanning element including scanning element frame supporting an illumination source, a lens and a full width array of photosensitive elements and means for providing a calibration target for said scanning element, said calibration providing means comprising:
   means on said device frame for supporting said scanning element frame for pivotal rotation about an axis arranged parallel to said document path, and transverse to the direction of document travel along said path;
   drive means coupled to said scanning element frame for controllably moving said scanning element frame in pivotal movement about said axis, to bring said illumination source, lens and array of photosensitive elements from a document scanning position past said calibration target.

7. The device as defined in claim 6 wherein said supporting means include a bearing member fixed to said device frame, supporting from free rotating movement thereon said scanning element frame.

8. The device as defined in claim 7 wherein said scanning element frame includes a pivot member, for engagement in free rotating movement with said bearing member fixed to said device frame.

9. The device as defined in claim 8, wherein said drive means coupled to said scanning element frame includes a motor and a drive transmission arrangement coupling said motor to said scanning element.

10. The device as defined in claim 9, wherein said drive transmission arrangement coupling said motor to said scanning element includes a pulley and drive belt arrangement having at least one pulley member directly coupled to each of said motor and said scanning element and a drive belt coupled to each pulley.

11. The device as defined in claim 6 wherein said axis of rotation extends through said scanning element.

12. The device as claimed in claim 6 wherein said means for driving said scanning element in rotation about said axis provides movement past a calibratiohn target, and to a service position.

13. An input scanner having a device frame supporting a document input, a document output and a document transport arrangement for carrying documents from said input to said output along a paper path, a scanning station located along said paper path for scanning documents transported therepast and having a least one scanning element including scanning element frame supporting an illumination source, a lens and a full width array of photosensitive elements and means for providing a calibration target for said scanning element, said calibration providing means comprising:

means on said device frame for supporting said scanning element frame for pivotal rotation about an axis arranged parallel to said document path, and transverse to the direction of document travel along said path; p1 drive means coupled to said scanning element frame for selectively moving said scanning element frame in pivotal movement about said axis, to bring said illumination source, lens and array of photosensitive elements from a document scanning position past said calibration target for calibration purposes, and to a service position providing access to said illumination source, lens and array of photosensitive elements.

14. The device as defined in claim 13 wherein said supporting means includes a bearing member fixed to said device frame, supporting from free rotatin movement therein said scanning element frame.

15. The devices as defined in claim 14 wherein said scanning element frame includes a pivot member, for engagement in free rotating movement with said bearing member fixed to said device frame.

16. The device as defined in claim 15, wherein said drive means coupled to said scanning element frame includes a motor and a drive transmission arrangement coupling said motor to said scanning element.

17. The device as defined in claim 16, wherein said drive transmission arrangement coupling said motor to said scanning element includes a pulley and drive belt arrangement having at least one pulley member directly coupled to each of said motor and said scanning element and a drive belt coupled to each pulley.

18. The device as defined in claim 13 wherein said axis of rotation extends through said scanning element.

* * * * *